Feb. 14, 1939.  W. A. McMILLAN ET AL  2,147,606
METHOD OF AND APPARATUS FOR GAS ANALYSIS
Filed April 5, 1934  2 Sheets-Sheet 2
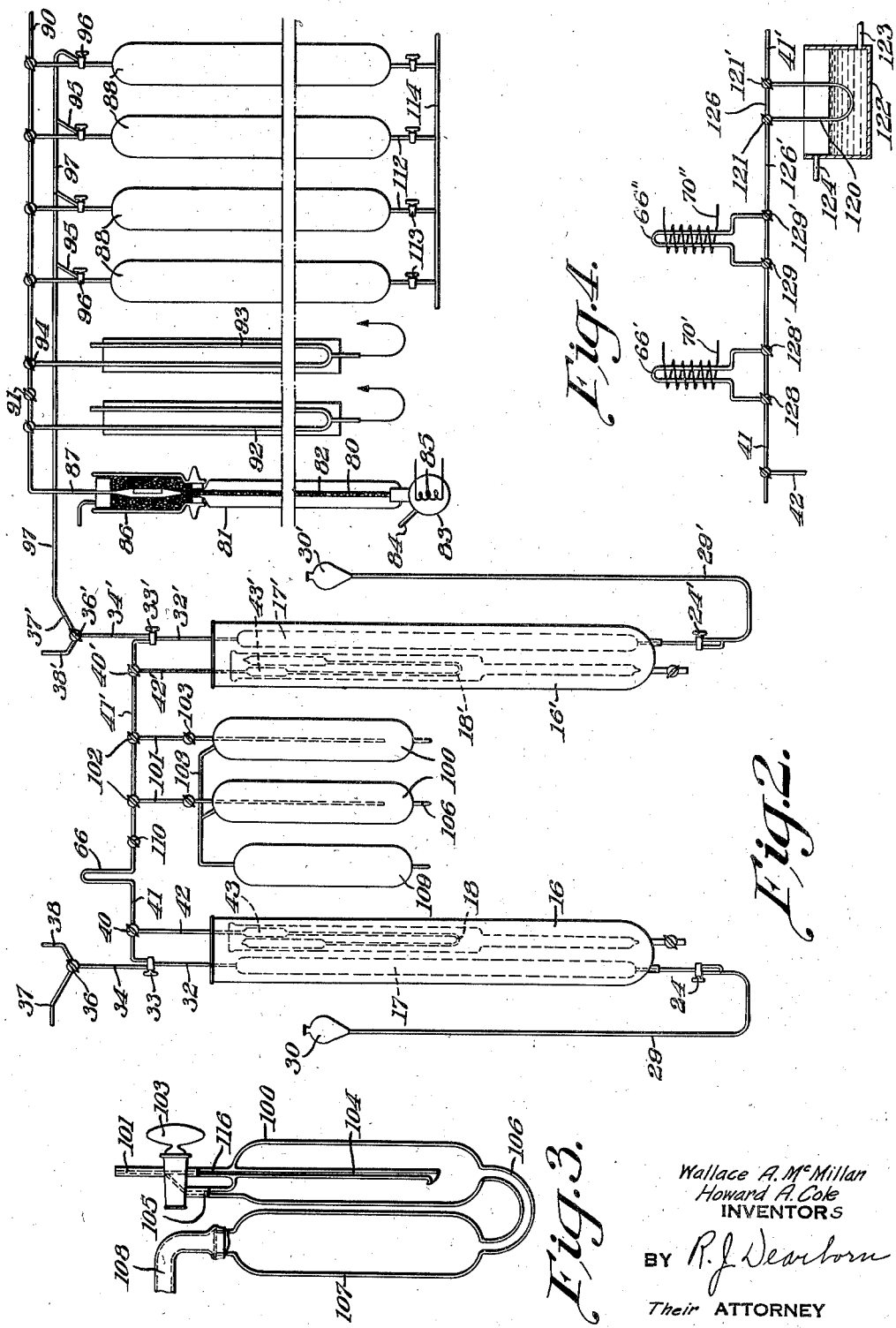
Wallace A. McMillan
Howard A. Cole
INVENTORS
BY R. J. Dearborn
Their ATTORNEY Patented Feb. 14, 1939

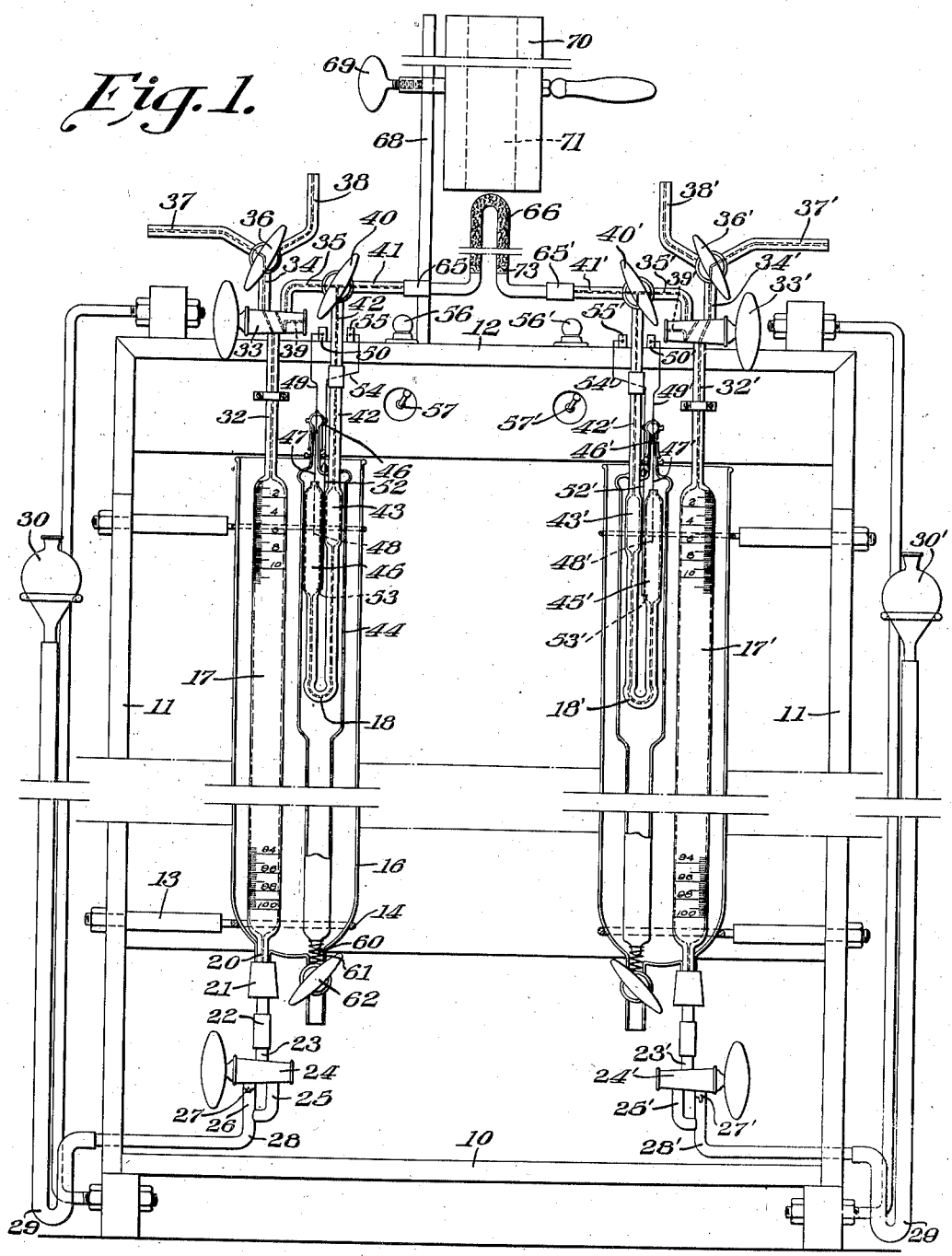

2,147,606

UNITED STATES PATENT OFFICE 2,147,606

METHOD OF AND APPARATUS FOR GAS ANALYSIS

Wallace A. McMillan, Beacon, and Howard A. Cole, Poughkeepsie, N. Y., assignors to The Texas Company, New York, N. Y., a corporation of Delaware Application April 5, 1934, Serial No. 719,092

7 Claims. (Cl. 23—232)

This invention relates to gas analysis.

Quantitative analysis of gaseous mixtures has heretofore been generally accomplished by passing the gaseous mixtures through various absorption mediums or liquids, which are active to absorb one or more constituents of the mixture, while remaining inactive to absorb other constituents of the mixture. While this type of equipment is satisfactory for the analysis of certain gaseous mixtures, it has proved of only rough accuracy for other gaseous mixtures, due to the inability to discover chemical reagents which are selective for one of the ingredients so as to absorb that ingredient to substantial completion, without at the same time absorbing any appreciable quantity of another constituent. This has been particularly true in the analysis of hydrocarbon gases containing both paraffin hydrocarbons and olefins. Such an absorption analysis is also time consuming, tedious, and difficult, due to the handling of the gaseous mixture in passage through a number of absorption reagents.

One of the principal objects of the present invention is to provide a method of and apparatus for gas analysis which is of quantitative accuracy, is readily and simply carried out and controlled, and which obviates the above-noted objections.

Another object of the invention is to provide a method of and apparatus for the easy and quantitative analysis of a complex mixture of gases which have hitherto proved incapable of accurate analysis with known equipment, such as a gaseous hydrocarbon mixture obtained from oil refineries, or other by-product gases, including complex mixtures of hydrocarbon gases containing both saturated and unsaturated hydrocarbon constituents.

Still another object of the invention is to provide a method of and apparatus for the easy and rapid determination of such constituents of gaseous mixtures as hydrocarbons, hydrogen, and hydrogen chloride.

Other objects and advantages of the present invention will be apparent from the following description, the accompanying drawings and appended claims.

In accordance with the present invention, a sample of a gaseous mixture to be analyzed is confined within a portion of a closed system of a chemical reaction and gas volume measuring unit, where its volume is capable of measurement under regulated conditions of temperature and pressure. Another gas of known composition is confined in another portion of the closed system where its volume is capable of measurement under regulated or the same conditions of temperature and pressure. This gas is chemically reactive with a constituent or constituents of the gaseous mixture to be analyzed. The gases are then mixed within the closed system and passed through a treating zone, as in contact with a catalyst, under such conditions that substantially complete reaction of the known gas with the constituent or constituents of the gaseous mixture takes place, resulting in a change or reduction in total volume of the gases. Then the volume of the reacted gases is measured under regulated or the same conditions of temperature and pressure, from which the proportion of the constituent or constituents of the gaseous mixture may be computed.

In the analysis of a mixture of hydrocarbon gases containing both saturated and unsaturated hydrocarbon constituents, the percentage of unsaturated constituents may be readily determined by reaction with hydrogen in the closed system in the presence of a hydrogenation catalyst. The percentage of hydrogen in a gaseous mixture may likewise be determined by reaction with a gas of known composition containing an unsaturated hydrocarbon, such as an olefin, in the closed system in the presence of a hydrogenation catalyst. The percentage of isobutylene in a gaseous mixture may be determined by reaction with dry hydrogen chloride, or a gas of known composition containing dry hydrogen chloride, in the closed system at a temperature below −10° C. Likewise, the percentage of hydrogen chloride in a gaseous mixture may be determined by reaction with isobutylene, or a gas of known composition containing isobutylene, in the closed system at a temperature below −10° C.

For more complicated gaseous mixtures, such as a hydrocarbon gas mixture containing a paraffin hydrocarbon, an olefin, and an unsaturated hydrocarbon of the chemical formula $C_nH_{2n-2}$, such as an acetylene, the chemical reaction and gas volume measuring unit is combined with an absorption unit. Thus, the gaseous mixture is first passed through an absorption medium which is effective to remove the acetylene with substantially quantitative accuracy, without absorption of the other constituents, in order to determine the percentage of the acetylene; and then the unabsorbed gaseous constituents are treated in the chemical reaction and gas volume measuring unit where the olefin is hydrogenated in a closed system with a known volume of hydrogen gas in contact with a hydrogenation catalyst, from which the percentages of olefin and paraffin hydrocarbon may be determined. Inasmuch as acetylene is more reactive chemically than olefin or paraffin hydrocarbons, it has proved feasible to separate acetylene by absorption methods, using certain reagents disclosed herein.

In the case of still more complicated gaseous mixtures, such as those frequently obtained from refineries or by-products operations, and which include a large number of hydrocarbons of varying boiling points, consisting of paraffin hydrocarbons, olefins and unsaturated hydrocarbons of the formula $C_nH_{2n-2}$, an analytical distilling and fractionating unit is combined with the chemical reaction and gas volume measuring unit, and also in some cases with an absorption unit, to obtain a complete analysis. Thus, a complicated gaseous mixture of hydrocarbons of this type is first fractionally distilled to separate the gases into a number of cuts of different boiling points. Some of the cuts may consist of substantially pure hydrocarbons, whose boiling points are sufficiently removed from those of other constituents present that they can be separated by the fractional distillation. Other cuts may consist of a mixture of a paraffin hydrocarbon and/or an olefin or olefins and/or a diolefin or acetylene, whose boiling points are sufficiently close together so that they come over in the same cut, or because the particular constituents have the property of forming a constant boiling mixture. In such case, the particular cut obtained by fractional distillation, is then passed to the chemical reaction and gas volume measuring unit where the unsaturated hydrocarbons are hydrogenated, and the reduction in volume measured. Or the particular cut may be first passed through an absorbing medium to remove the acetylene, and then treated in the hydrogenation unit. The first cut, by fractionation, of a refinery gas almost invariably contains fixed gases, including any oxygen, carbon monoxide, hydrogen or nitrogen that is present, and some methane. This cut may then be analyzed by the combined absorption and catalyst reaction or hydrogenation methods outlined above and described more in detail below.

In the drawings, in which like characters of reference designate like parts throughout the several views thereof, Fig. 1 is an elevational view, partially in section, illustrating a chemical reaction and gas volume measuring unit constructed in accordance with the present invention;

Fig. 2 is a diagrammatic elevational view of the unit of Fig. 1 used in conjunction with an analytical distilling and fractionating unit and/or an absorption unit;

Fig. 3 is a detail sectional view of an absorption pipette used in Fig. 2; and

Fig. 4 is a partial elevational view of a modification of the chemical reaction unit.

Referring to the drawings, in which are illustrated a preferred embodiment of the invention, the numeral 10 indicates the base of a stand or support for the chemical reaction and gas volume measuring unit. The support also comprises spaced uprights 11 arranged at opposite sides of the stand, and a cross piece 12 at the upper portion thereof. Mounted on the upright 11 by suitable supports 13 carrying rings 14, is a sample receiving and gas measuring unit consisting of the water jacket 16, a calibrated burette 17 and a manometer 18. While this unit may be of any suitable construction capable of accurately measuring the volume of gas under regulated conditions of temperature and pressure, that shown is of the type described by Shepherd in the Bureau of Standards Journal of Research, 6, 121 (1931), as representing a sturdy construction capable of easy operation and control with a high degree of accuracy.

As shown, the lower constricted end 20 of the burette passes through an opening in the bottom of the water jacket 16, which is sealed by a rubber stopper 21. The extended end of the burette is connected by rubber tubing 22 with a glass tubing 23 containing a stop cock 24 arranged to control communication of 23 either with a rapid flow passage 25 or a capillary flow passage 26 containing an orifice member 27 which materially restricts the rate of flow through this particular passage. Both passages 25 and 26 communicate with a tube 28 connected by rubber tubing 29 with a leveling bulb 30 arranged to be mounted at various elevations. The burette, leveling bulb and connecting tube contain a sufficient quantity of mercury so that the burette 17 can be completely filled with the mercury to expel gas therefrom. The upper end of the burette 17 communicates by capillary tubing 32 with a stop cock 33 constructed to control communication either with tubing 34 or tubing 35. Within tubing 34 is a stop cock 36 controlling communication of 34 with a line 37 leading to a source of gas under pressure, or with a line 38 opening to atmosphere. The stop cock 33 also has a radial discharge port 39 opening to atmosphere which can be connected to 35 so that this line can be purged with gas which escapes to atmosphere.

Within tubing 35 is a 3-way T cock 40 controlling communication of 35 with capillary tube 41 and capillary tube 42. Tube 42 communicates with one leg 43 of the manometer 18, this leg being positioned within a compensating tube 44. The other leg 45 of the manometer opens within the upper portion of the compensating tube 44 which is provided with a cap 46 adapted to connect the interior of tube 44 with the atmosphere. Cap 46 carries a platinum contact 47 which extends down into the interior of the leg 45, terminating as shown at 48. Platinum contact 47 is connected by lead 49 with a binding post 50 mounted on cross piece 12. Tube 44 also carries a second platinum contact 52 which extends down through the upper portion of compensating tube 44 on the exterior of the manometer legs, and enters the interior of leg 45 below the normal mercury level therein as indicated at 53. Platinum contact 52 is connected by lead 54 with binding post 55. This forms part of an electric circuit containing an electric light bulb 56, a control switch 57, a battery (not shown) for supplying current, and a suitable condenser within the circuit to eliminate sparking. The compensating tube 44 is supported at its lower end by spring socket 60 mounted in a discharge channel 61 of the water jacket 16 controlled by valve 62.

Mounted on the other upright 11 of the frame is a second sample receiving and gas measuring unit, which is exactly identical with that described above, except that one is lefthand and the other righthand. No further description of this second unit is therefore though necessary. Corresponding parts of this second unit are designated with primed numerals.

Capillary tubes 41 and 41' are connected by rubber connections 65 and 65' respectively with opposite ends of a catalyst tube 66, formed in the shape of an inverted U. Mounted on a bracket 68 by clamp 69, and capable of adjustment therealong, is an electrical heater 70 having a socket 71 adapted to receive the inverted U portion of the catalyst tube 66 when the heater 70 is lowered. Suitable electrical connections (not shown) are provided for supplying current to a resistance coil within the heater, so that the catalyst tube may be heated to a high temperature, such as above 300° C., as occasion may demand. For atmospheric temperature catalysts, the heater 70 is normally left in the raised position shown. The catalyst tube 66 is readily replaceable by reason of the rubber connections 65 and 65', so that tubes containing different catalysts may be employed for different gases.

Assuming that a sample of gaseous hydrocarbon mixture containing both saturated and unsaturated hydrocarbons is to be analyzed for unsaturated hydrocarbon content, any suitable hydrogenation catalyst may be employed within the tube 66. Preferably, a catalyst which is effective at atmospheric temperatures is used. For this purpose, very satisfactory results have been secured with catalysts selected from reduced nickel, cobalt and platinum. By way of example, the preparation of such a reduced nickel catalyst is herein described. In an evaporating dish, an amount of nickel nitrate hexahydrate, $Ni(NO_3)_2.6H_2O$, is melted in its own water of crystallization. Shredded long fibre asbestos—which has previously been digested with hot nitric acid, washed, dried and ignited—is then added until the solution is all absorbed. Any excess moisture is then pressed out and drained. The material is then lightly calcined until part of it appears black and the remainder greenish yellow. After cooling, the mass is broken up into small pieces and added to the U shaped catalyst tube 66 until the legs of the U are substantially filled. Both ends of the U tube are then plugged loosely with ignited asbestos or glass wool as indicated at 73, and the glass below the plugs is indented to keep the plugs in place. The tube is now heated to a temperature of about 310° C. while pulling air through it. This is continued until no further brown fumes are evolved and the whole mass has become entirely black. The tube is cooled, connected to the apparatus as shown in Fig. 1, and flushed out with hydrogen. This is accomplished by connecting line 37 with a source of hydrogen under pressure, removing cock 33 and closing the ends of its barrel with corks, and the various cocks turned to connect 37 through 34, 35, 41, 66, 41', 35' and 39' to atmosphere. Or the connection may be made in the same way from 35' through 34' and 38' to atmosphere. After flushing with hydrogen, the U tube 66 is then heated by the heater 70 for several hours at a temperature not exceeding about 325° C., while a current of hydrogen is still passing through the tube. Care should be taken to prevent ingress of air, as oxygen poisons the catalyst. When once poisoned the U tube is flushed with hydrogen, and is reheated in an atmosphere of hydrogen at a temperature not exceeding about 325° C. for a short time, generally about 10 minutes. When cooled, it will be found that the activity of the catalyst is effectively restored.

With the catalyst tube 66 activated as described above, and the manifold from 33 to 33' filled with hydrogen, the leveling bulbs 30 and 30' are adjusted to bring the mercury within burettes 17 and 17' to the same level. Valves 40 and 40' are then opened facing cocks 33 and 33' respectively, thereby providing communication from 42 to 35 and 32, and from 42' to 35' and 32', so that each manometer is thus in communication with its respective burette. Leveling bulbs 30 and 30' are then lowered, cocks 24 and 24' being opened, so as to lower the liquid level in the burettes and thereby draw out the gas in the manometer legs 43 and 43', until the mercury levels of these compensator manometers rise to just touch valves 40 and 40' respectively. In that position, cocks 33 and 33' are reversed to close communication between 35 and 32 as well as between 35' and 32', and to open communication of 32 with 34, and of 32' with 34'. Cocks 36 and 36' are then opened to provide communication of atmospheric legs 38 and 38' with 34 and 34' respectively. The gas contents of burettes 17 and 17' are then discharged to the atmosphere by raising bulbs 30 and 30' until the mercury rises within 17 and 17' until it just touches 36 and 36', the latter being then closed. The burettes and their respective manometers are now filled with mercury and free from gas.

Connection is then made from 37 to a cylinder of pure hydrogen through a suitable reducing valve. After purging through lines 37 and 38 to atmosphere, hydrogen is admitted through 37, 34 and 32 into burette 17, valves 33 and 36 being set accordingly. About 70 or 80 ml. of hydrogen are drawn into the burette. Cock 36 is then closed, and 33 is reversed to provide communication between the burette 17 and the compensator manometer 18 to allow the pressure of hydrogen to level the manometer. This is accomplished by raising bulb 30 and allowing mercury to flow through passage 25 and cock 24 into burette 17, thereby transferring hydrogen from 17 into the leg 43 of the manometer, and consequently raising the mercury level in the leg 45 of this manometer. As the mercury level in 45 approaches the platinum contact at 48, the cock 24 is reversed to then allow mercury to flow slowly through the capillary passage 26, so that the mercury within the manometer leg 45 then rises at a correspondingly slow rate. When the level finally comes into contact with the lower end of the platinum contact, the electric circuit through 53, 48 and the mercury is then completed, which lights bulb 56, indicating to the operator that the proper conditions have been attained. At this time, the cock 24 is closed, and cock 40 is then closed to 42 and turned to open communication between catalyst tube 66 and the burette 17. Manometer leg 43' is filled with hydrogen through cock 40', catalyst tube 66 and other connections from burette 17, the operation being accomplished in the same manner as described above. After cock 40' is closed to the manometer leg 43' (which has been filled with hydrogen and compensated), the remaining hydrogen is then flushed out the tail or passage 39' of cock 33' by raising the mercury level within 17. Finally, the mercury within 17 is brought up to the cock 36 in the manner previously described. Both compensating manometers are now set, the manifold is filled with pure hydrogen, and the burettes are filled with mercury so that they are in condition to supply samples thereto. It is assumed that the burettes have been checked as to volume against each other, and the volume of each, including the space within the manometer, made equal to the other. This is accomplished by adding to or withdrawing mercury from one or the other of the compensator manometers. When once adjusted, no further changes are necessary, unless mercury is accidently lost from either of the compensator manometers. The apparatus is now ready for an analysis.

A sample of pure hydrogen is now admitted through 36 and 33 into the burette 17, until about 50 ml. is taken; 36 is then closed, and 33 opened to the manifold. With the mercury levels in 30 and 17 approximately equal, cock 40 is then opened to establish communication between the burette 17 and both the catalyst tube 66 and the manometer leg 43. The mercury in the compensator manometer leg 45 is then adjusted to the contact point 48 by adjusting bulb 30 and allowing flow through cock 24 in the manner previously described. When the light 56 flashes, 24 is closed and the reading then taken in the burette, representing the amount of hydrogen added.

Approximately 50 ml. of gaseous mixture to be analyzed is then admitted into the burette 17' in a similar manner to that previously described for the hydrogen sample, except that cock 40' is closed to the catalyst tube 66 until the sample of gaseous mixture has been admitted, compensated and the reading taken in the burette 17' for the amount of sample added.

With cocks 40 and 40' opened, the mercury in legs 43 and 43' is then pulled up until it just touches cocks 40 and 40' so as to expel all gas from the manometer legs, which are then closed from the manifold. Cocks 24 and 24' are then opened full,—that is, to passages 25 and 25'. The hydrogen in burette 17 is then passed through the manifold and mixed with the sample in burette 17' by raising leveling bulb 30 and lowering bulb 30'. Thereafter, the gases are thoroughly mixed by being passed back and forth from one burette to the other through the manifold and catalyst tube, by alternately raising and lowering leveling bulbs 30 and 30' for from three to five times.

Cocks 24 and 24' are then partially closed so that the speed of transfer from one burette to the other is reduced to about 2 minutes per pass each way. During the passage of the mixed gases through the manifold in contact with the catalyst, the unsaturated hydrocarbon constituents of the gaseous mixture are hydrogenated to paraffin hydrocarbons. Care is taken that a sufficient quantity of hydrogen is added initially in the burette 17 for complete reaction and conversion of the unsaturated hydrocarbons to saturated hydrocarbons. In the case of olefins, the reaction may be represented as follows:

$$C_nH_{2n} + H_2 = C_nH_{2n+2}$$
1 vol. + 1 vol. = 1 vol.

It is thus seen that the reaction produces a loss or contraction in volume of gas, and that the loss in volume is a direct measure of the amount of olefin present. In the case of diolefins or acetylenes, the reaction may be represented as follows:

$$C_nH_{2n-2} + 2H_2 = C_nH_{2n+2}$$
1 vol. + 2 vols. = 1 vol.

Thus the loss in gas volume resulting from the reaction of diolefins or acetylenes is equivalent to twice the amount of such diolefins or acetylenes present in the gaseous mixture.

After about 5 complete passes through the catalyst tube, in the manner described above, the reaction is generally complete. The levels in the burettes 17 and 17' are then approximately balanced against their respective bulbs. Cocks 40 and 40' are then carefully opened, with 40' establishing communication between manometer leg 43' and burette 17', and 40 establishing communication between manometer leg 43 as well as catalyst tube 66 and the burette 17. The mercury levels in the manometer legs 45 and 45' are then raised to the contact points in the manner described above, when the readings of the two burettes are then taken. This insures that the readings are taken under the same pressure as the original readings for the samples; and the water jackets 16 and 16' insure that the temperatures are also maintained substantially constant. Consequently, this avoids computations due to corrections for temperature and pressure. The total contraction in volume from the readings of the two burettes is thus obtained, which represents the loss in volume due to the hydrogenation reaction. In order to be certain that the reaction has gone to completion, two additional complete passes of the mixed gases are made through the catalyst tube, and the contraction in volume again noted. If the volumes remain constant during this latter treatment, the operator is assured that the reaction has gone to completion. If a further contraction in volume results, the operation is repeated until the volume remains constant.

The final readings, which represent the total contraction in volume, are the readings selected. From this, the percentage of unsaturated hydrocarbons in the gaseous mixture may be computed from the equations set forth above. While pure hydrogen is preferably selected as the gas of known composition in making the analysis, it is also to be understood that other suitable gas of known composition containing hydrogen may be employed, suitable allowance being made therefor in the calculations. As set forth above, the analysis is preferably made at room temperature. However, when appreciable amounts of carbon monoxide are also present in the gaseous mixture to be analyzed, the catalyst becomes inactive at room temperature, but remains active at temperatures approximating 180°–195° C., at which temperatures quantitative results may be obtained. After once being poisoned, the catalyst must be flushed with hydrogen and heated in an atmosphere of hydrogen to not over 325° C. On cooling, the activity is restored. Oxygen also poisons the catalyst, but its activity is restored by treatment in the same manner as for carbon monoxide poisoning. Small amounts of air in the sample result in the hydrogenation of its oxygen according to the equation:

$$O_2 + 2H_2 = 2H_2O$$
1 vol. + 2 vols. = 0 vol.

Thus three volumes disappear (due to condensation of the water vapor produced) for each volume of oxygen present. If the presence of oxygen in the sample is suspected, it should be tested for oxygen, and the hydrogenation results corrected accordingly.

While the method and apparatus set out above have been described as applied to the analysis of unsaturated hydrocarbons in a gaseous mixture, they may be equally well applied to the analysis of a gaseous mixture to determine the percentage of hydrogen present. This may be accomplished by using a gas of known composition containing an unsaturated hydrocarbon for reaction with the gaseous mixture containing hydrogen which is to be analyzed. Preferably, a pure olefin, such as propylene is used; in such case, the contraction in volume is a direct measure of the hydrogen present.

Referring to Figs. 2 and 3, there is diagrammatically illustrated apparatus for the analysis of more complicated gaseous mixtures, such as fixed gases from cracking plants and the like. Such gases frequently contain paraffin hydrocarbons, olefins and unsaturated hydrocarbons of the chemical formula $C_nH_{2n-2}$, such as acetylene. In analyzing such mixtures, the gas is first fractionally distilled to separate it into cuts of different boiling points. This is accomplished in an analytical distilling and fractionating unit, such, for example, as that illustrated in the co-pending application of Wallace A. McMillan, Serial No. 706,479, filed January 13, 1934.

Such a unit comprises an elongated fractionating tube 80 of small diameter, provided with a vacuum jacket 81. The tube 80 contains suitable packing 82 to increase the path of flow and intimacy of contact of vapors with reflux liquid therein. The lower end of the tube communicates with a distilling bulb 83 to which the sample is supplied by tube 84, and which may be surrounded by a suitable thermos bottle for low temperature work. A submerged electrical heating coil 85 affords means for the controlled heating of the sample. The upper end of the tube 80 is cooled by a partial condenser 86, to which is supplied liquid air or other suitable cooling medium. Vapors, which remain uncondensed, pass by capillary tube 87 to one of a plurality of receivers shown at 88. The manifold 87 extends beyond the receivers 88, as indicated at 90, and is connected to a suitable vacuum pump which is adapted to evacuate the entire unit. The pressure of distillation is controlled by a suitable rate rock 91, and is measured by a manometer 92 communicating with tube 87. The pressure of distilled gas in any one of the receivers 88 is measured by a manometer 93 connected to the manifold 87 through cock 94.

In operation, a sample of the gas to be analyzed is supplied to bulb 83, and is precooled and liquefied by surrounding the bulb with a thermos flask containing liquid air or other suitable cooling medium. The first fixed gas cut is collected in one of the receivers 88 for further analysis. A controlled heating of the sample then effects distillation of the liquefied portion, the vapors passing upwardly through tube 80, a portion of the vapors being condensed by partial condenser 86, thereby providing reflux for the column which travels down the tube 80 countercurrent to the up-flowing vapors. The sharp fractionation thereby obtained enables the separation of constituents of the mixture according to their boiling points, the temperature of distillation being measured by a suitable thermocouple (not shown) positioned in the vapor manifold 87 adjacent condenser 86. As long as one constituent or compound of the mixture is being vaporized, the distillation temperature will remain substantially constant. During this time, the distilled vapors are collected in one of the receivers 88.

After the lowest boiling constituent has been substantially distilled, the distillation temperature will then rise to the boiling point of another ingredient. At this time, the quantity of the first ingredient so distilled is determined by measuring the pressure thereof by the manometer 93. The vapors of subsequent distillation are then led to another receiver 88, so that the various constituents of the gaseous mixture are separately collected. In complicated hydrocarbon mixtures containing both saturated and unsaturated hydrocarbons, it may not prove possible to separate certain saturated or unsaturated hydrocarbons having approximately the same boiling points. It is also found that certain constituents tend to form constant boiling mixtures, such for example, as acetylene and ethane. The net result is that the distilled vapor accumulated in one or more of the receivers 88 may still be a mixture of two or more hydrocarbons. For example, in an original mixture which contains acetylene, ethane and ethylene, in addition to other hydrocarbon constituents of higher and lower boiling points, it is found that one of the cuts will comprise a mixture of the acetylene, ethane and ethylene. The gross amount of the mixture can be determined by the analytical fractionation; but in order to determine the percentages of the individual compounds, the mixture must then be further analyzed by an absorption unit in combination with the chemical reaction and gas volume measuring unit shown in Fig. 1. Of course, not all the separate cuts in the receivers 88 will require further analysis, for the difference in boiling points between adjacent constituents may be sufficient to enable sharp separation of certain of the individual compounds by the analytical distillation and fractionation. An operator can readily learn by experience, with the particular types of gas being analyzed, which cuts require further treatment.

Referring to Fig. 2, each of the receivers 88 is connected by a branch tube 95 controlled by a cock 96 with a gas transfer manifold 97 leading to the burette 17' of the chemical reaction unit shown in Fig. 1. The manifold 97 communicates with the tube 37' of the device as shown in Fig. 1. The construction of the reaction unit is identical with that shown in Fig. 1, except for the connection of certain absorption pipettes thereto, and the same numerals are used to designate corresponding parts. Between the valve 40' and the catalyst reaction tube 66, there is connected to the tubing 41' one or more absorption pipettes as indicated at 100. Each of these may be of the conventional Orsat type of bubbling pipette, as shown more particularly in Fig. 3. Each pipette is connected by a capillary tube 101 with the tube 41', under the control of a stop cock 102. Within tube 101 is positioned a second stop cock 103 controlling communication of 101 with a submerged bubbling tube 104, or a relief tube 105 opening into the upper end of the pipette. The lower end of the pipette is connected by a curved tube 106 with a vessel 107, the upper end of which is connected by tube 108 with a sealing pipette 109. The sealing pipette may be in the form of a manometer having an adjustable liquid or mercury bulb (not shown) for varying the pressure within the tubing or manifold 108, and consequently the pressure on the liquid within the vessel 107 of each pipette. This construction is employed to close the liquid employed in the absorption pipette 100 from the atmosphere, and at the same time to enable the sealing pipette to take care of changes in volume of the reagents during analysis. A stop cock 110 is preferably positioned between 66 and 102 for the protection of the catalyst. Each receiver 88 communicates by tubing 112 controlled by valve 113 with a manifold 114, the latter being supplied with a transfer liquid from a suitable vessel (not shown) and under pressure of a compressed gas. The transfer liquid is forced at substantially atmospheric pressure by the compressed gas into the lower end of a receiver 88 to thereby displace the gas sample into the transfer manifold 97, from where it is introduced into the burette 17'. In Fig. 2, the fractionating column 81, manometers 92 and 93, and receivers 88 are broken away intermediate their ends for convenience in illustration. These parts are of considerably greater lengths than the lengths of the burettes 17 and 17' and the compensating manometers 18 and 18'. For example, in a specific embodiment of the apparatus which has given very satisfactory results, the overall length of the fractionating tube is about 49 inches, whereas the length of the jacket 16 of the compensating manometer and burette is about 27 inche, the manometer 18 being about 6 inches in length.

Assuming a mixed hydrocarbon gas containing acetylene is to be analyzed, one of the pipettes 100 is partially filled with a suitable liquid which is effective to absorb acetylene without any substantial absorption of other constituents such as olefin or paraffin gases. Reagents for this purpose may be prepared as follows:

Reagent 1

| | |
|---|---|
| Potassium hydroxide dissolved in 250 cc. of distilled water_____grams__ | 28.05 |
| Mercuric cyanide dissolved in the said potassium hydroxide solution_____grams__ | 50 |

Reagent 2

| | |
|---|---|
| Potassium iodide_____grams__ | 12.5 |
| Mercuric chloride_____do____ | 5.0 |
| Potassium hydroxide dissolved in distilled water and made up to 250 cc____grams__ | 1.5 |

Reagent 3

| | |
|---|---|
| Cupric nitrate pentahydrate dissolved in 50 cc. distilled water_____grams__ | 20.0 |
| 28% ammonium hydroxide made up to 250 cc. with distilled water_____cc__ | 26.0 |

Other suitable reagents may be prepared by substituting cobaltous nitrate or nickel nitrate for the cupric nitrate specified in Reagent 3. To each of these reagents is preferably added a small amount, such as 5 cc. of a 2% gelatine solution made by dissolving 2 g. of gelatine in 98 cc. of water. The gelatine is found particularly valuable in dragging down precipitates of acetylides in the lower portions of the pipette, and thus keeping the ball valves and capillaries free from such deposits. While any one of the above-mentioned reagents may be employed with satisfactory results, Reagent No. 1, containing 2% by weight of a 2% gelatine solution, is preferred.

In operation, the lefthand burette 17, catalyst tube 66 and manifold to the cock 33' are purged and filled at atmospheric pressure with the auxiliary gas to be used, in this case hydrogen, in the manner described above in connection with Fig. 1. The sample of gas from the particular receiver 88 is then transferred to the righthand burette 17'. This is accomplished by opening valves 96, 36' and 33', and then opening 113 to allow the transfer liquid to flow into the lower end of the receiver 88 and displace the gas through the transfer manifold 97 to the burette 17'. The sample is then compensated by the compensator manometer 18', and its volume then measured at the controlled temperature and pressure in the manner described above in connection with Fig. 1. Where the sample is to be analyzed directly for unsaturated content, the absorption pipettes 100 are disconnected from the manifold 41' by proper manipulation of cocks 102, and the sample is mixed with hydrogen and passed back and forth through the catalyst tube 66 in the manner previously described. However, for the sample assumed above containing both an olefin and acetylene, the sample is first passed to the absorption unit for an absorption analysis of the acetylene. This is accomplished in the conventional manner of an Orsat gas analysis such as described by Shepherd in Bureau of Standards Journal of Research, 6 (1931), page 121, or in Gas Chemists' Handbook, third edition, published by The American Gas Association (1929), page 229.

Thus, with the liquid in the pipette 100 adjusted to completely fill the pipette and bring the level thereof to the etched marks 116 of the capillary tubes 104 and 105, the gas sample is transferred from the burette 17' to the absorption pipette. The valve 103 is turned to provide communication between 101 and 104, and to close communication between 101 and 105. This causes the gas to pass down the tube 104 to the lower end of the pipette and then bubble up through the liquid in the pipette. Accumulation of gas within the pipette forces a portion of the liquid into the vessel 107. The transfer from burette 17' is accomplished by raising the leveling bulb 30' so as to fill the burette with mercury. After the sample has been transferred to the absorption pipette, the leveling bulb 30' is again lowered, and valve 103 is turned to connect 101 with 105, and to close communication between 101 and 104. This causes the unabsorbed gas to be drawn back into the burette 17'. Several passes of the gas into the absorption liquid are made in this manner, until the volume of unabsorbed gas remains substantially constant. After the final pass into the absorption pipette and the withdrawal of the gas therefrom back to the burette 17', the liquid level in the pipette 100 is again adjusted to the marks 116 by adjustment of the leveling bulb 30'. The unabsorbed gas within the burette 17' is then compensated and its volume read. The reduction in volume represents the amount of acetylene which has been absorbed.

The stop cock 102 is then turned to disconnect the absorption pipette, and cock 110 turned to open communication between the catalyst tube 66 and the burette 17'. The measured quantity of hydrogen within the burette 17 is then mixed with the remaining unabsorbed and measured volume of gas within the burette 17', and the mixed gases passed back and forth through the catalyst tube to effect the hydrogenation of the olefin in the sample, in the manner described above. Following this, the readings of compensated gas volumes within the burettes 17 and 17' are taken. The reduction in gas volume is a direct measure of the amount of olefin present. The amount of paraffin hydrocarbon in the sample can then be computed by difference. Thus, in the particular cut taken by way of example, the total amount of the cut, including ethane, ethylene and acetylene, is determined by the analytical distillation and fractionation. The amount of acetylene is determined by absorption; the amount of ethylene by hydrogenation; and the amount of ethane by difference.

As an alternative procedure, a measured and predetermined portion of a cut from one of the receivers 88 may be transferred to the burette 17'. This portion may then be hydrogenated to convert both the olefins and diolefins or acetylenes to saturated hydrocarbons, thereby obtaining a reading for total unsaturated content.

The remaining portion of the sample may then be transferred to the burette 17', after the previous portion has been analyzed and exhausted therefrom. This portion is then subjected to an absorption analysis in the absorption pipette 100, from which the proportion of diolefin or acetylene may be determined. From this data, the proportions of paraffin hydrocarbon, olefin and unsaturated hydrocarbon of the formula $C_nH_{2n-2}$ may be completed.

In the case of a simpler gas mixture, which does not require analytical distillation and fractionation to separate it into cuts of different boiling points, but which contains both an olefin and an unsaturated hydrocarbon of the formula $C_nH_{2n-2}$, the sample may be transferred directly to the burette 17'. After compensation and measurement of the volume of the sample, an absorption analysis to determine the percentage of the unsaturated hydrocarbon of the formula $C_nH_{2n-2}$ is made. Following this, the unabsorbed portion of the sample is mixed with hydrogen, and the mixture passed back and forth through the catalyst tube of the catalyst reaction unit in order to determine the proportion of olefin by hydrogenation. Any paraffin hydrocarbon may then be determined by difference.

It is to be noted that in the embodiment shown in Fig. 2, the sample receiving and measuring unit,—namely, the burette 17 and manometer 18,—of the chemical reaction and gas volume measuring device, is employed as the sample receiving and volume measuring portion of the absorption unit. This provides an economical and more convenient arrangement, obviating at least one transfer and volume measurement of the gaseous mixture being handled. However, a separate pipette and manometer can be used for the absorption unit; and the gaseous sample, after an absorption analysis, transferred to the chemical reaction and volume measuring unit.

In the analysis of refinery gases, such as cracked gases, where the gases are fractionally distilled to separate the same into cuts, it is also found that a particular cut may contain several isomeric olefins in addition to a saturated hydrocarbon. For example, a cut may be obtained containing several butylenes in the presence of a butane. Hydrogenation of the unsaturated hydrocarbons in such a cut will give a determination of the total quantity of the several butylenes present. We have found that a more complete analysis of such a cut may be effected by first removing the isobutylene from the cut, followed by hydrogenation of the remaining butylene, whereupon the paraffin hydrocarbon may be determined by difference. The separation of isobutylene from 1-butylene in the presence of isobutane and/or n-butane and 2-butylene may be effected in the chemical reaction and gas volume measuring unit by mixing a measured volume of dry hydrogen chloride gas, or a gas of known composition containing dry hydrogen chloride, with a measured volume of the gas containing isobutylene at a temperature below $-10°$ C. Under these conditions, the isobutylene adds HCl according to the equation

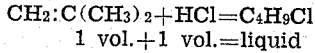

1 vol.+1 vol.=liquid

At the same time, the normal butylene remains unaffected, and can then be determined by hydrogenation. A gaseous mixture containing isobutylene may be analyzed to determine the percentage of isobutylene in the same manner. Similarly, a gaseous mixture containing hydrogen chloride may be analyzed by reacting a known volume of the gaseous mixture with a known volume of isobutylene, or a gas of known composition containing isobutylene, at a temperature below $-10°$ C.

Referring to Fig. 4, there is shown apparatus for the analysis of a cut containing isobutylene or a gas containing hydrogen chloride, in the manner described above. In this case, the chemical reaction and gas volume measuring unit is identical with that shown in Fig. 1, with the exception of the manifold connecting 41 with 41'. In place of the catalyst tube 66, a depending U tube 120 is mounted between 41 and 41', under the control of 3-way T cocks 121 and 121'. The U tube 120 is immersed in a cooling tank 122 to which refrigerated brine is supplied by line 123 and discharged by line 124. The gas passing through the U tube 120 is cooled to a temperature below $-10°$ C., so that the reaction is carried out at the desired low temperature.

Fig. 4 also discloses a manifold connecting the two burettes of the chemical reaction and volume measuring unit, which manifold includes a plurality of gas treating zones. Thus, cock 121 may be turned to open communication between 126' and 120 while closing communication with manifold 126. Or, cock 121 can be turned to open communication between 126' and manifold 126 while closing communication to 120. Cock 121' likewise controls communication of 41' with 120 or manifold 126. Interposed between manifolds 41 and 126' are a plurality of gas treating zones, shown as two catalyst tubes 66' and 66", under the control of 3-way T cocks 128—128' and 129—129' respectively. The catalyst tubes are provided with electrical heating coils 70' and 70" respectively. For example, one of the catalyst tubes may contain a hydrogenation catalyst of the type described above, whereas the other catalyst tube may contain an oxidation catalyst of the type described above. With this arrangement, a gas being analyzed in the chemical reaction and gas volume measuring unit can be passed through any one of the chemical treating zones desired, depending upon the constituent being determined, thereby avoiding the necessity of replacing the catalyst tube or low temperature U tube with another chemical treating zone. Any suitable number of chemical treating zones, or catalyst tubes, can be mounted in the unit between further extensions of manifolds 41 and 41'; and the particular chemical treating zone through which the gas is passed upon transfer from one burette to the other, is selectively controlled by proper manipulation of the control valves or cocks.

The fixed gas cut, by fractionation, of a refinery gas, may also be analyzed by the combination absorption and chemical reaction units. For example, any oxygen present in the fixed cut may be first removed by absorption is pyrogallol. The hydrogen in the cut may then be determined by hydrogenation with an olefin, or a gas of known composition containing an unsaturated hydrocarbon. The carbon monoxide in the cut may be determined by oxidation in the presence of an oxidation catalyst, with oxygen or a gas of known composition containing oxygen. As an alternative procedure, following the absorption of oxygen by pyrogallol, the carbon monoxide may be removed by absorption in a conventional absorption medium; and the hydrogen in the cut then determined by reacting with an unsaturated hydrocarbon gas of known composition by a hydrogenation reaction. It is seen that the method and apparatus are extremely flexible, and the particular procedure selected can be varied widely to suit the convenience of the operator in accordance with the particular gaseous mixture being treated.

Reference is made to applicants' co-pending divisional application Serial No. 133,936, filed March 31, 1937, wherein there is disclosed and claimed the apparatus for carrying out the method of gas analysis claimed herein.

Obviously many modifications and variations of the invention, as hereinbefore set forth, may be made without departing from the spirit and scope thereof, and therefore only such limitations should be imposed as are indicated in the appended claims.

We claim:

1. The method of quantitatively determining the percentage of unsaturated hydrocarbon constituents in a gaseous mixture containing the same, which comprises mixing in a closed system known volumes of the gaseous mixture and gaseous hydrogen, passing the mixed gases in the closed system at temperatures varying from atmospheric temperature up to about 195° C. in contact with a hydrogenation catalyst having the effective catalytic action of reduced nickel, cobalt, or platinum under conditions inducing substantially complete hydrogenation of the unsaturated gaseous hydrocarbons to saturated gaseous hydrocarbons, there being an excess of hydrogen over that required for complete reaction, and measuring the contraction in volume of the mixed gases, from which the percentage of unsaturated gaseous hydrocarbons in the mixed gas may be computed.

2. The method of quantitatively determining the percentage of gaseous olefins in a gaseous mixture containing the same, which comprises mixing in a closed system known volumes of the gaseous mixture and hydrogen, passing the mixed gases in the closed system at temperatures varying from atmospheric temperature up to about 195° C. in contact with a hydrogenation catalyst having the effective catalytic action of reduced nickel, cobalt, or platinum under conditions inducing substantially complete hydrogenation of the gaseous olefins to gaseous paraffin hydrocarbons, there being an excess of hydrogen over that required for complete reaction, and measuring the contraction in volume of the mixed gases, from which the percentage of gaseous olefins may be calculated on the basis that the loss in volume is a direct measure of the amount of olefins present.

3. The method of quantitatively determining the percentage of unsaturated gaseous hydrocarbons having the formula $C_nH_{2n-2}$ in a gaseous mixture containing the same, which comprises mixing in a closed system known volumes of the gaseous mixture and hydrogen, passing the mixed gases in the closed system at temperatures varying from atmospheric temperature up to about 195° C. in contact with a hydrogenation catalyst having the effective catalytic action of reduced nickel, cobalt, or platinum under conditions inducing substantially complete hydrogenation of the said unsaturated gaseous hydrocarbons to gaseous paraffin hydrocarbons, there being an excess of hydrogen over that required for complete reaction, and measuring the contraction in volume of the reacted gases, from which the percentage of the gaseous unsaturated hydrocarbons having the formula $C_nH_{2n-2}$ may be calculated on the basis that the loss in volume represents twice the amount of the said unsaturated hydrocarbons present.

4. The method in the quantitative determination of the percentage of unsaturated gaseous hydrocarbon constituents in a gaseous mixture containing the same, which comprises introducing a sample of the gaseous mixture to be analyzed to a portion of a closed system, measuring the volume of the sample in the said portion under regulated conditions of temperature and pressure, introducing a sample of a gas of known composition containing hydrogen into another portion of the closed system, measuring the volume of the known gas under controlled conditions of temperature and pressure, then mixing the gases within the closed system, flowing the mixed gases within the closed system for a number of passes at temperatures varying from atmospheric temperature up to about 195° C. in contact with a hydrogenation catalyst having the effective catalytic action of reduced nickel, cobalt, or platinum under conditions inducing substantially complete hydrogenation of the unsaturated gaseous hydrocarbons to saturated gaseous hydrocarbons, there being an excess of hydrogen over that required for complete reaction, and measuring the contraction in volume of the mixed gases under controlled conditions of temperature and pressure, from which the percentage of unsaturated gaseous hydrocarbons in the mixed gas may be computed.

5. The method in the quantitative analysis of a gaseous mixture containing both saturated and unsaturated gaseous hydrocarbon constituents, wherein an unsaturated gaseous hydrocarbon constituent has a boiling point approximating that of a saturated gaseous hydrocarbon constituent, which comprises fractionally distilling the gaseous mixture to separate the same into cuts of different boiling points, one of the cuts containing both a saturated gaseous hydrocarbon and an unsaturated gaseous hydrocarbon of approximately the same boiling points, mixing in a closed system known volumes of hydrogen and the said cut containing both saturated and unsaturated gaseous hydrocarbons, passing the mixed gases in the closed system at temperatures varying from atmospheric temperature up to about 195° C. in contact with a hydrogenation catalyst having the effective catalytic action of reduced nickel, cobalt, or platinum under conditions inducing substantially complete hydrogenation of the unsaturated gaseous hydrocarbon to a saturated gaseous hydrocarbon, there being an excess of hydrogen over that required for complete reaction, and measuring the contraction in volume of the mixed gases, from which the percentage of unsaturated gaseous hydrocarbon in the said cut may be computed.

6. The method in the quantitative analysis of a gaseous mixture containing a gaseous paraffin hydrocarbon, a gaseous olefin and an unsaturated gaseous hydrocarbon of the formula $C_nH_{2n-2}$, which comprises passing the gaseous mixture through an absorption medium effective to remove the unsaturated gaseous hydrocarbon of the formula $C_nH_{2n-2}$ to determine the proportion thereof, mixing in a closed system known volumes of the remaining gaseous mixture and hydrogen, passing the mixed gases in the closed system at temperatures varying from atmospheric temperature up to about 195° C. in contact with a hydrogenation catalyst having the effective catalytic action of reduced nickel, cobalt, or platinum under conditions inducing substantially complete hydrogenation of the gaseous olefin to a saturated gaseous hydrocarbon, there being an excess of hydrogen over that required for complete reaction, and measuring the contraction in volume of the mixed gases, from which the percentage of gaseous olefin in the remaining gaseous mixture may be computed.

7. The method in the quantitative analysis of a gaseous mixture containing gaseous paraffin hydrocarbons, gaseous olefins and unsaturated gaseous hydrocarbons of the formula $C_nH_{2n-2}$, which comprises fractionally distilling the gaseous mixture to separate the same into cuts of different boiling points, one of the cuts containing a saturated gaseous hydrocarbon, a gaseous olefin and an unsaturated gaseous hydrocarbon of the formula $C_nH_{2n-2}$, passing the said one cut through an absorption medium effective to absorb the unsaturated gaseous hydrocarbon having the formula $C_nH_{2n-2}$ to thereby determine the proportion thereof, mixing in a closed system known volumes of hydrogen with the remaining gaseous mixture from said one cut, passing the mixed gases in the closed system at temperatures varying from atmospheric up to about 195° C. in contact with a hydrogenation catalyst having the effective catalytic action of reduced nickel, cobalt or platinum under conditions inducing substantially complete hydrogenation of the gaseous olefin to a saturated gaseous hydrocarbon, there being an excess of hydrogen over that required for complete reaction, and measuring the contraction in volume of the mixed gases, from which the percentage of gaseous olefin in the said one cut may be computed.

WALLACE A. McMILLAN.
HOWARD A. COLE.